United States Patent
Thangaraj et al.

(10) Patent No.: US 10,769,053 B2
(45) Date of Patent: Sep. 8, 2020

(54) METHOD AND SYSTEM FOR PERFORMING USER INTERFACE VERIFICATION OF A DEVICE UNDER TEST

(71) Applicant: HCL Technologies Limited, Noida (IN)

(72) Inventors: Selvaraj Thangaraj, Chennai (IN); Siva Sakthivel Sadasivam, Chennai (IN)

(73) Assignee: HCL Technologies Limited, Noida, Uttar Pradesh ( * ) Notice: Subject to any disclaimer, the term of this patent is extended or adjusted under 35 U.S.C. 154(b) by 0 days.

(21) Appl. No.: 16/354,196

(22) Filed: Mar. 15, 2019

(65) Prior Publication Data

US 2019/0303275 A1    Oct. 3, 2019

(30) Foreign Application Priority Data

Mar. 30, 2018    (IN) .............................. 201811012057

(51) Int. Cl.
  *G06F 11/36*    (2006.01)
  *G06T 3/00*    (2006.01)
  (Continued)

(52) U.S. Cl.
  CPC ...... *G06F 11/3664* (2013.01); *G06F 9/44505* (2013.01); *G06F 11/3688* (2013.01);
  (Continued)

(58) Field of Classification Search
  CPC ... G06F 11/3664–3696; G06F 9/44505; G06K 9/3233; G06K 9/3275; G06K 9/344; G06K 2209/01; G06T 3/0068
  (Continued)

(56) References Cited

U.S. PATENT DOCUMENTS 6,956,966 B2    10/2005    Steinberg
7,106,376 B1    9/2006    Anderson
(Continued)

OTHER PUBLICATIONS

Chang, T-H, et. al., GUI Testing Using Computer Vision, Proceedings of the SIGCHI Conference on Human Factors in Computing Systems, Apr. 2010, pp. 1535-1544, [retrieved on May 7, 2020], Retrieved from the Internet.*
(Continued)

*Primary Examiner* — Geoffrey R St Leger
(74) *Attorney, Agent, or Firm* — HM Law Group LLP; Vanintheran Moodley (57) ABSTRACT

Disclosed is a system for performing User Interface (UI) verification of a Device Under Test (DUT). Before performing the UI verification, a set of corner markers is positioned at corners of a display frame associated to the DUT. Once the set of corner markers are positioned, an image receiving module receives a DUT image, captured by an image capturing unit, of the UI pertaining to a DUT. A skew correction module for correcting orientation of the DUT image by determining an orientation correction factor. A file configuration module for storing the orientation correction factor in a pre-configuration file when the DUT image is occupying the content greater than the predefined threshold percentage. In one aspect, the orientation correction factor may be referred while testing a UI of the DUT.

13 Claims, 5 Drawing Sheets

(51) Int. Cl.
  *G06K 9/32* (2006.01)
  *G06K 9/34* (2006.01)
  *G06F 9/445* (2018.01)
(52) U.S. Cl.
  CPC ........ *G06F 11/3692* (2013.01); *G06K 9/3233* (2013.01); *G06K 9/3275* (2013.01); *G06K 9/344* (2013.01); *G06T 3/0068* (2013.01); *G06K 2209/01* (2013.01)
(58) Field of Classification Search
  USPC .................................................. 717/124, 125
  See application file for complete search history.

(56) References Cited

U.S. PATENT DOCUMENTS

| | | |
|---|---|---|
| 9,071,785 B2 | 6/2015 | Cassanego |
| 10,225,480 B2* | 3/2019 | Itoh ..................... H04N 5/2354 |
| 2006/0210192 A1 | 9/2006 | Orhun |
| 2010/0245824 A1 | 9/2010 | Schwarz |
| 2011/0221893 A1* | 9/2011 | Kasahara ............ G06F 3/04845 348/136 |
| 2012/0098848 A1* | 4/2012 | Choi ........................ G09G 3/20 345/589 |
| 2013/0132912 A1* | 5/2013 | Kim .................... G06F 3/04812 715/857 |
| 2014/0325484 A1* | 10/2014 | Gillaspie ............. G06F 11/3604 717/124 |
| 2015/0378878 A1* | 12/2015 | Sadasivam .......... G06F 11/3692 717/125 |
| 2017/0094161 A1* | 3/2017 | Graham ............... G06K 9/3275 |
| 2019/0026577 A1* | 1/2019 | Hall ..................... G06K 9/2054 |

OTHER PUBLICATIONS

Garousi, V., et al., Comparing Automated Visual GUI Testing Tools: An Industrial Case Study, Proceedings of the 8th ACM SIGSOFT International Workshop on Automated Software Testing, Sep. 2017, pp. 21-28, [retrieved on May 7, 2020], Retrieved from the Internet.*

* cited by examiner

METHOD AND SYSTEM FOR PERFORMING USER INTERFACE VERIFICATION OF A DEVICE UNDER TEST

CROSS REFERENCE TO RELATED APPLICATIONS

This patent application claims benefit from Indian Complete Patent Application No. 201811012057 filed on 30 Mar. 2018 the entirety of which is hereby incorporated by reference.

TECHNICAL FIELD

The present subject matter described herein, in general, relates to perform User Interface (UI) verification of a Device Under Test (DUT). More particularly, a system and method for verifying the UI of the DUT by correcting orientation of a captured image.

BACKGROUND

In this competitive world, if a commodity/product is launched in the market with less defects, the profit earned by a manufacturer, of the commodity, is huge. To do so, manufacturers have to ensure quality of the commodity/product before it's launch. In addition to the quality, it is further important to launch the commodity/product at the right time to limit the competition. Therefore, the manufacturers may opt for an automation testing that enable the manufacturers to launch the commodity/product while maintaining the quality.

In the domain of electronic goods, it becomes necessary to verify a User Interface (UI) of a display device before the launch. Examples of the display device may include Television and Monitor. If the display device has a standard display output interfaces, the verification of the UI may be performed by capturing the display through various available interfaces. Examples of the available interfaces may include High-Definition Multimedia Interface (HDMI) and Video Graphics Array (VGA). However, when the display device does not have the standard display output interfaces, it becomes a challenge for the manufactures to verify the UI of the display device.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for performing User Interface (UI) verification of a Device Under Test (DUT) and the concepts are further described below in the detailed description. This summary is not intended to identify essential features of the claimed subject matter nor is it intended for use in limiting the scope of the claimed subject matter.

In one implementation, a system for performing User Interface (UI) verification of a Device Under Test (DUT) characterized by correcting orientation of a captured image associated to the UI is disclosed. The system may comprise a processor and a memory coupled to the processor. The processor may execute a plurality of modules present in the memory. The plurality of modules may comprise an image receiving module, a skew correction module, and a file configuration module. In order to correct the orientation, initially, a corner marker, of a set of corner markers, may be positioned at each corner of a display frame associated to the DUT. Once the set of corner markers is positioned, the image receiving module may receive a DUT image of a UI pertaining to a DUT. In one aspect, the DUT image may be captured by an image capturing unit. The skew correction module may correct the orientation of the DUT image by determining an orientation correction factor. In one aspect, the orientation correction factor may be determined by verifying whether each corner marker, positioned at respective corners of the display frame, is present in the DUT image. Subsequently, the skew correction module zooms at least one of IN and OUT a focus of the image capturing unit in a manner such that each corner marker is present in the DUT image. It may be noted that the focus may be zoomed when at least one corner marker, of the set of corner markers, is absent in the DUT image captured by the image capturing unit. Thereafter, the skew correction module aligns the DUT image based on the set of corner markers. After aligning the DUT image, the skew correction module verifies a content and a location of the content present in the DUT image upon referring to a DUT configuration file. In one aspect, the DUT configuration file comprises metadata associated to the content. Subsequent to the verification of the content and the location of the content, the skew correction module determines whether the DUT image is occupying the content greater than a predefined threshold percentage of content present in the UI of the DUT. The file configuration module may store the orientation correction factor in a pre-configuration file when the DUT image is occupying the content greater than the predefined threshold percentage. It may be noted that the orientation correction factor may be referred while testing a UI of the DUT.

In another implementation, a method for performing User Interface (UI) verification of a Device Under Test (DUT) characterized by correcting orientation of a captured image associated to the UI is disclosed. Before performing the UI verification of the DUT, a corner marker, of a set of corner markers, may be positioned at each corner of a display frame associated to the DUT. Subsequent to the positioning of the corner marker, a DUT image of a UI pertaining to a DUT may be received. In one aspect, the DUT image may be captured by an image capturing unit. Upon capturing the DUT image, orientation of the DUT image may be corrected by determining an orientation correction factor. In one aspect, the orientation correction factor may be determined by verifying whether each corner marker, positioned at respective corners of the display frame, is present in the DUT image. Subsequently, a focus of the image capturing unit may be zoomed at least one of IN and OUT in a manner such that each corner marker is present in the DUT image. It may be noted that the focus may be zoomed when at least one corner markers, of the set of corner markers, is absent in the DUT image captured by the image capturing unit. Thereafter, the DUT image may be aligned based on the set of corner markers. After aligning the DUT image, a content and a location of the content present in the DUT image may be verified upon referring to a DUT configuration file. In one aspect, the DUT configuration file comprises metadata associated to the content. Subsequently, it is determined whether the DUT image is occupying content greater than a predefined threshold percentage of content present in the UI of the DUT. After determining that the DUT image is occupying the content greater than a predefined threshold percentage, the orientation correction factor may be stored in a pre-configuration file. It may be noted that the orientation correction factor may be referred while testing a UI of the DUT. In one aspect, the aforementioned method for performing the UI verification of the DUT may be performed by a processor using programmed instructions stored in a memory.

In yet another implementation, non-transitory computer readable medium embodying a program executable in a computing device for performing User Interface (UI) verification of a Device Under Test (DUT) characterized by correcting orientation of a captured image associated to the UI is disclosed. The program may comprise a program code for positioning a corner marker, of a set of corner markers, at each corner of a display frame associated to the DUT. The program may further comprise a program code for receiving a DUT image of a UI pertaining to a DUT, wherein the DUT image is captured by an image capturing unit. The program may further comprise a program code for correcting orientation of the DUT image by determining an orientation correction factor, wherein the orientation correction factor is determined by verifying whether each corner marker, positioned at respective corners of the display frame, is present in the DUT image, zooming at least one of IN and OUT a focus of the image capturing unit in a manner such that each corner marker is present in the DUT image, wherein the focus is zoomed when at least one corner marker, of the set of corner markers, is absent in the DUT image captured by the image capturing unit, aligning the DUT image based on the set of corner markers, verifying a content and a location of the content present in the DUT image upon referring to a DUT configuration file, wherein the DUT configuration file comprises metadata associated to the content, and determining whether the DUT image is occupying content greater than a predefined threshold percentage of content present in the UI of the DUT. The program may further comprise a program code for storing the orientation correction factor in a pre-configuration file when the DUT image is occupying the content greater than the predefined threshold percentage, wherein the orientation correction factor is to be referred while testing a UI of the DUT.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

To overcome the challenges as aforementioned, the proposed invention facilitates to perform the UI verification of a Device Under Test (DUT) by correcting orientation of a captured image associated to the UI. In order to correct the orientation and thereby verifying the UI, an image capturing unit is mounted at a specific location to capture an image of the UI pertaining to the DUT. It may be noted that the image capturing unit is mounted in a manner such that a display frame, of the DUT, is always in a Region of Interest (RoI) of the image capturing unit. Before capturing the image, the proposed invention utilizes a set of corners markers wherein a corner marker, of the set of corner markers, is positioned at each respective corner of the display frame. In one aspect, the set of corner markers may be positioned to indicate a periphery of the display frame and thereby enabling the image capturing unit to only capture the display frame. The image capturing unit then captures a DUT image comprising content being displayed on the UI. Once the image is captured, the orientation of the DUT image may be corrected by determining an orientation correction factor. The orientation correction factor may be determined by verifying whether the set of corner markers are present in the DUT image.

In one embodiment, if the set of corner markers are present in the DUT image, the orientation of the DUT image may be verified. In one aspect, the orientation correction may be verified by verifying a content (including a textual content and a pictorial content) and a location of the content in the DUT image upon referring to a DUT configuration file. It may be noted that the DUT configuration file storing the textual content and the location of the content. In another embodiment, if at least one of the set of corner markers is absent in the DUT image, the system uses a zoom IN/OUT feature of the image capturing unit in order to capture each marker of the set of corner markers and the aforementioned process may be followed for correcting the orientation of the DUT image, if needed.

After correcting the orientation, the DUT image is verified to determine whether the DUT image is occupying the content greater than a predefined threshold percentage of content present in the UI of the DUT. If the DUT image has occupied the content greater than the predefined threshold percentage, the orientation correction factor may be stored in the pre-configuration file and thereby referred while testing the UI of the DUT. Thus, in this manner, the proposed invention facilitates to perform UI verification of the DUT. While aspects of described system and method for performing the UI verification of the DUT may be implemented in any number of different computing systems, environments, and/or configurations, the embodiments are described in the context of the following exemplary system.

Figure 1:
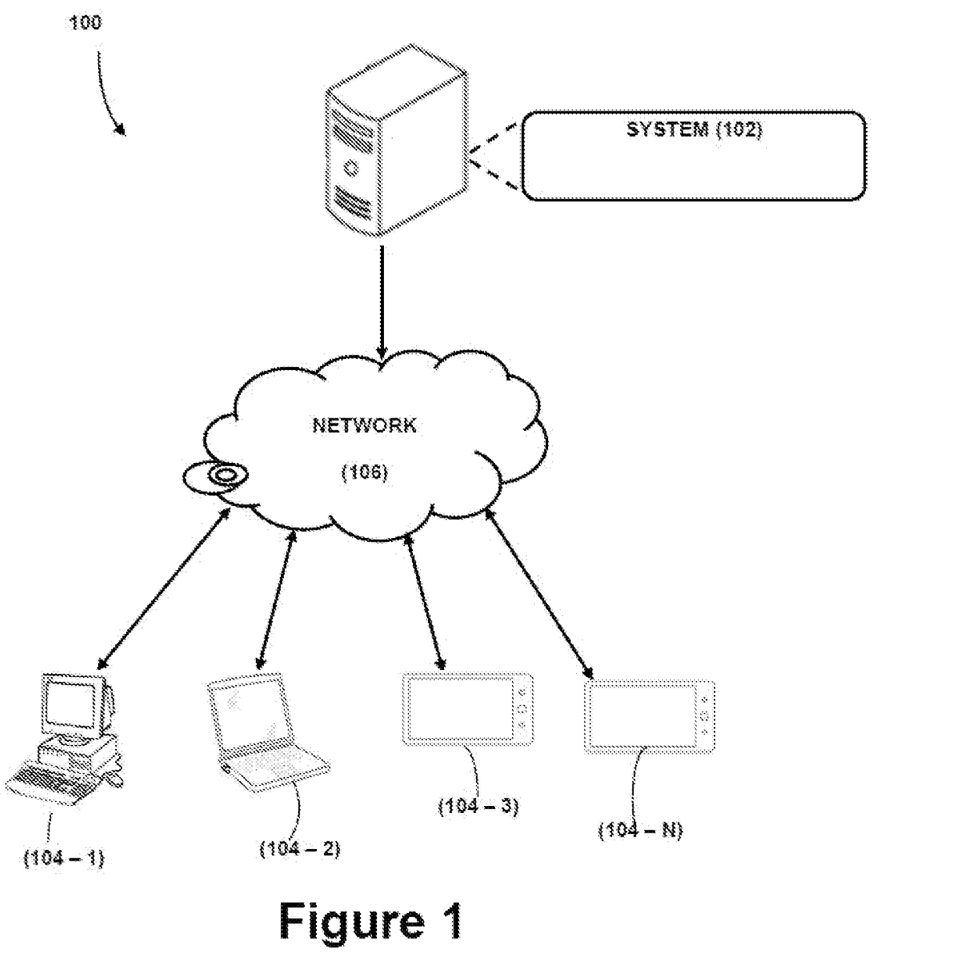
FIG. 1 illustrates a network implementation of a system for performing User Interface (UI) verification of a Device Under Test (DUT), in accordance with an embodiment of the present subject matter.

Referring now to FIG. 1, a network implementation 100 of a system 102 for performing User Interface (UI) verification of a Device Under Test (DUT) is disclosed. Before performing the UI verification of the DUT, a corner marker, of a set of corner markers, may be positioned at each corner of a display frame associated to the DUT. Subsequent to the positioning of the corner marker, the system 102 receives a DUT image of a UI pertaining to a DUT. Upon capturing the DUT image, the system 102 corrects orientation of the DUT image by determining an orientation correction factor. In one aspect, the orientation correction factor may be determined by verifying whether each corner marker, positioned at respective corners of the display frame, is present in the DUT image. Subsequently, the system 102 zooms a focus of the image capturing unit at least one of IN and OUT in a manner such that each corner marker is present in the DUT image. It may be noted that the focus may be zoomed when at least one corner marker, of the set of corner markers, is absent in the DUT image captured by the image capturing unit. Thereafter, the system 102 aligns the DUT image based on the set of corner markers. After aligning the DUT image, the system 102 verifies a content and a location of the content present in the DUT image upon referring to a DUT configuration file. In one aspect, the DUT configuration file comprises metadata associated to the content. Subsequently, the system 102 determines whether the DUT image is occupying content greater than a predefined threshold percentage of content present in the UI of the DUT. After determining that the DUT image is occupying the content greater than a predefined threshold percentage, the system 102 stores the orientation correction factor in a pre-configuration file. It may be noted that the orientation correction factor may be referred while testing a UI of the DUT.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2 . . . 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a IoT device, IoT gateway, portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Hypertext Transfer Protocol Secure (HTTPS), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
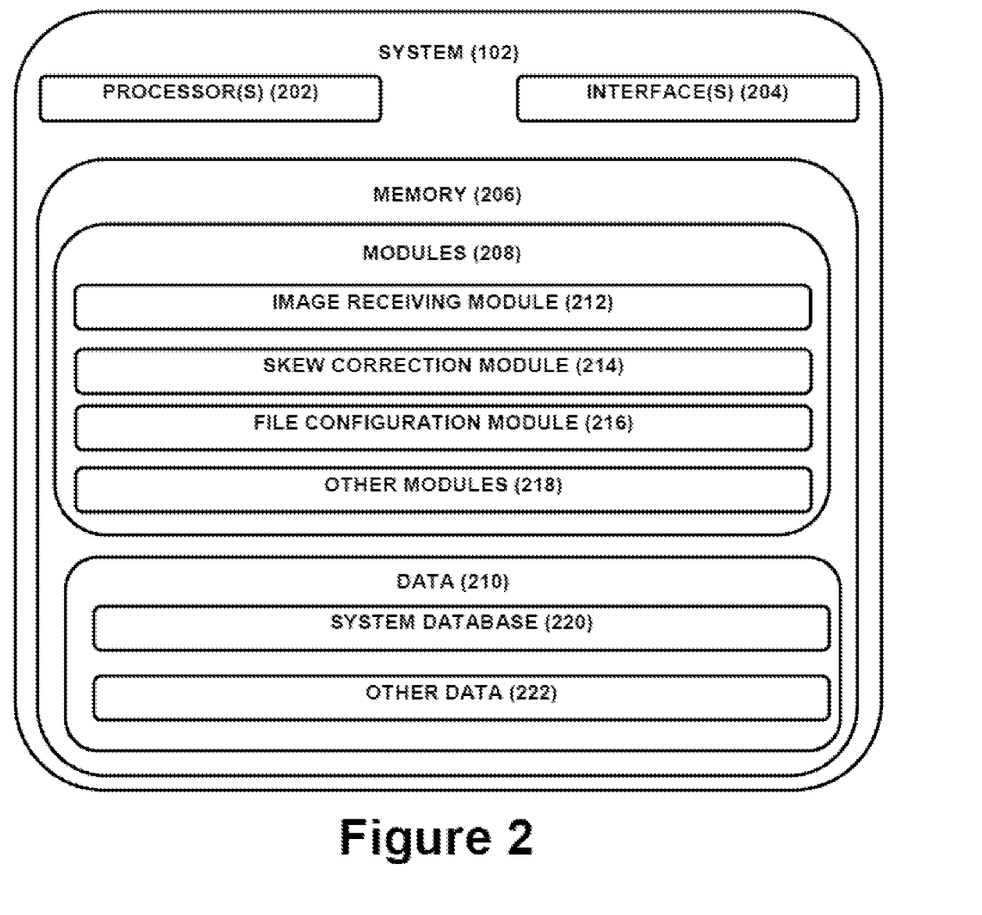
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include an image receiving module 212, a skew correction module 214, a file configuration module 216, and other modules 218. The other modules 218 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 220 and other data 222. The other data 222 may include data generated as a result of the execution of one or more modules in the other modules 218.

Figure 3:
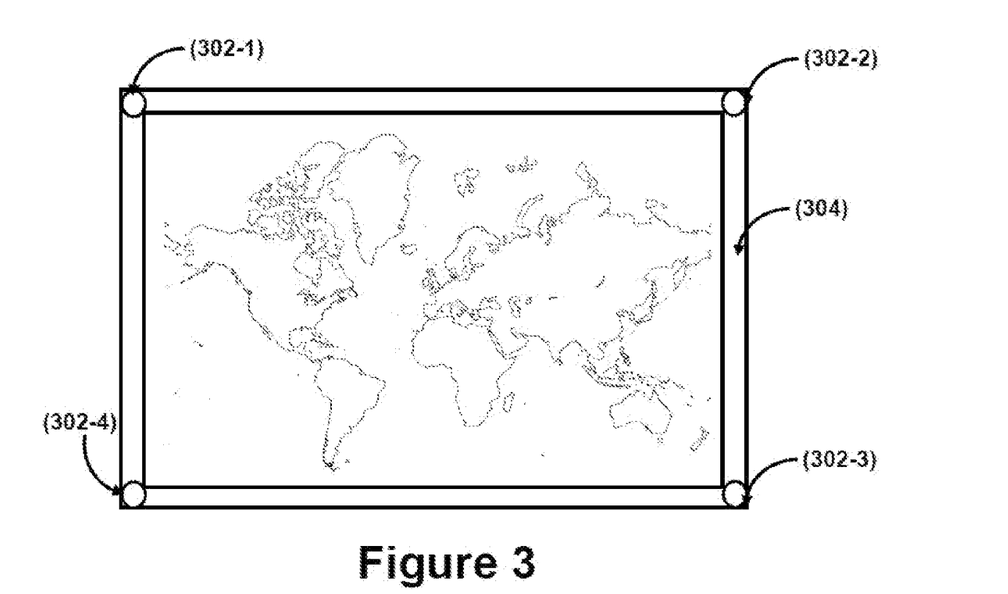
FIGS. 3 and 4 illustrate a frame of the DUT with respective corner markers and splitting the frame into a plurality of zones respectively, in accordance with an embodiment of the present subject matter.

As there are various challenges observed in the existing art, the challenges necessitate the need to build the system 102 for performing User Interface (UI) verification of a Device Under Test (DUT). At first, a user may use the user device 104 to access the system 102 via the I/O interface 204. The user may register them using the I/O interface 204 to use the system 102. In one aspect, the user may access the I/O interface 204 of the system 102. In order to perform the UI verification, initially, a set of corner markers (302-1, 302-2 ... 302-n), hereinafter also referred to as 302, may be positioned at corners of a display frame 304 associated to the DUT, as shown in FIG. 3. It may be noted that the set of corner markers 302 may be of any solid colors or icons and highly contrast from display colors of the DUT. Examples of a corner marker may include a sticker, an object. It may further be noted that the set of corner markers 302 may be of same size and color.

In addition to the positioning the set of corner markers 302, an image capturing unit may be mounted at a specific position to capture the UI of the DUT. In one embodiment, the image capturing unit may be mounted in such a way that the image capturing unit captures the set of corner markers 302 along with content being displayed on the UI of the DUT. After configuring the image capturing unit and the set of markers 302, the system may employ the image receiving module 212, the skew correction module 214, and the file configuration module 216 to perform UI verification. The detail functioning of the modules is described below with the help of figures.

In order to perform the UI verification of the DUT, the image receiving module 212 receives a DUT image of the UI pertaining to the DUT. It may be noted that the DUT image may be captured by the image capturing unit. Since the DUT image plays an important role in verifying the UI of the DUT, it becomes utmost important to ensure that the DUT image is captured appropriately. To ensure the quality of the DUT image, the image receiving module 212 corrects the orientation of the DUT image. In one aspect, the orientation may be corrected based on presence of each of the set of corner makers 302 in the DUT image. Though the image capturing unit is mounted in a manner such that the image capturing unit captures the DUT image in which each of the set of corner markers 302 is present in the DUT image. It may be possible that the image capturing unit may not capture each of the set of corner markers 302 in the DUT image.

To ensure the presence of each of the set of corner markers 302, the skew correction module 214 determines an orientation correction factor. The orientation correction factor may be determined by verifying whether each corner marker, positioned at respective corners of the display frame, is present in the DUT image. If at least one corner marker, of the set of corner markers 302, is absent in the DUT image, the skew correction module 214 zooms at least one of IN and OUT a focus of the image capturing unit in a manner such that each corner marker is present in the DUT image.

Once it is ensured that each corner marker is present in the DUT image, the skew correction module 214 checks whether the DUT image is aligned. It may be understood that the set of corner markers 302, when captured in the DUT image, is not aligned to each other. Thus, before further processing, the system 102 aligns the set of corner markers 302 thereby aligning the DUT image.

In order to align the set of corner markers 302, the skew correction identifies a corner marker positioned at each corner in the DUT image. Upon identification of each corner, the skew correction module 214 verifies alignment of the set of corner markers 302 in the DUT image. When the skew correction module 214 verifies that any two corner markers, of the set of corner markers 302, are not aligned, the skew correction module 214 rotates the DUT image to align the two corner markers thereby correcting the skew in the DUT image.

After the skew correction, the skew correction module 214 verifying a content and a location of the content present in the DUT image upon referring to a DUT configuration file. The DUT configuration file may comprise metadata associated to the content. In one aspect, the content may comprise a textual content or a pictorial content. Whereas the location may comprise X, Y coordinates of each pixel pertaining to the textual content and the pictorial content. The metadata may comprise a textual content, a pictorial content, X, Y coordinates of each pixel pertaining to the textual content and the pictorial content present in the UI of the DUT, display resolution, Region of Interest (ROI), and expected text.

In one embodiment, the content is verified by comparing the content with the metadata present in the DUT configuration file. It may be noted that the textual content may be extracted, prior to the verification, from the content upon applying at least one of an Optical Character Recognition (OCR) technique and a Pattern Identification technique on the DUT image. The location of the content, on the other hand, is verified upon comparing X, Y coordinates of the content with X, Y coordinates of content, corresponding to the content, as stored in the DUT configuration file. Thus, in this manner, the skew correction module 214 verifies the content and the location of the content present in the DUT image upon referring to the DUT configuration file.

Post verification of the content and the location of the content, the skew correction module 214 checks whether the DUT image includes more than a predefined threshold percentage of the content being displayed on the UI of the DUT. If the DUT image includes less than the predefined threshold percentage, the skew correction module 214 uses an optical Zoom-IN/OUT feature of the image capturing unit to zoom into the UI so that the DUT image occupies most of the content being displayed on the UI. In one example, the predefined threshold percentage is '50%'.

If the DUT image is occupying the content greater than the predefined threshold percentage (i.e. '50%'), the file configuration module 216 stores the orientation correction factor in a pre-configuration file. It may be noted that the determination of orientation correction factor is one-time process for the Test Setup and the output of process is stored in the pre-configuration file as the orientation correction factor that may be referred while testing the UI of the DUT.

Figure 4:
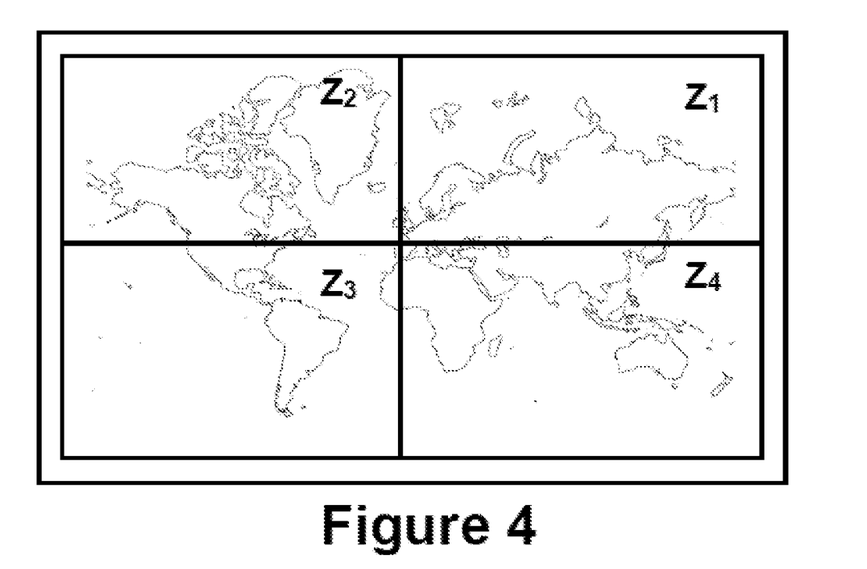

Once the orientation correction factor is determined and stored in the pre-configuration file, the pre-configuration file and the DUT configuration file may be referred to test the UI of the DUT. It may be noted that before executing a test case, the display frame of the DUT may be split into a plurality of zones ($Z_1$, $Z_2$, $Z_3$, $Z_4$), as shown in FIG. 4. The details of each zone including the content (comprising textual and pictorial content and a location of the content) are configured in the DUT configuration file. In other words, each zone comprises the metadata including a subset of the content and the location of the subset of content. The metadata associated with each zone is stored in the DUT configuration file, wherein the metadata pertaining to a zone, of the plurality of zones, is used based on a test case selected to test the UI of the DUT.

Figure 5:
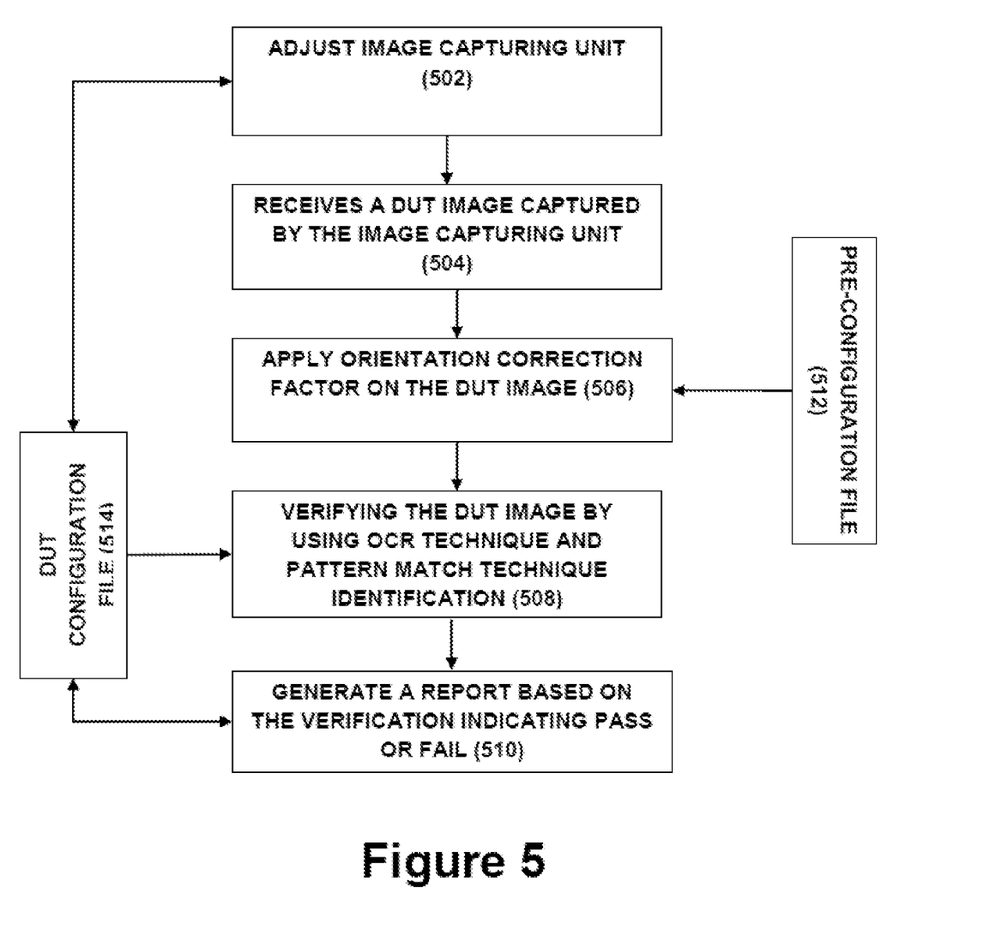
FIG. 5 illustrates a method for testing the UI verification of the DUT, in accordance with an embodiment of the present subject matter.

Referring to FIG. 5. In one example, the system 102 adjust the image capturing unit, at block 502, and receives a DUT image captured by the image capturing unit, at block 504. The system 102 may then apply the orientation correction factor on the DUT image upon referring to the pre-configuration file (512), at block 506. Based on a test scenario, the DUT image (comprising content and a location of the content) may be verified by using OCR technique and Pattern match technique, at block 508. In one aspect, the DUT image may be verified by verifying the content and the location of the content upon referring to the DUT configuration file (514) storing the content along with their respective location. The content and location of the content (of the DUT image) may be verified by comparing X, Y coordinates of the content with the corresponding X, Y coordinates of pixels associated to the content present in the DUT configuration file (514). If the X, Y coordinates of the content are matched, the system 102 generates a report based on the verification of the content and the location of the content, at block 510. In one aspect, the report indicates a test status of the test DUT image either as PASS or FAIL thereby ensures the UI verification of the DUT. Thus, in this manner, the system 102 performs the UI verification of the DUT.

In another example, if the entire image verification is not required by a test case, the system may focus and zoom to the particular zone during the execution of the test case. Upon execution, the details of the respective zone, to be focused, may be retrieved from the DUT configuration file (514). By using the above configuration, the system 102 may capture the DUT image and applies the orientation correction factor upon referring to the pre-configuration file (512). Based on the test scenario, the DUT image (comprising content and a location of the content) may be verified by using OCR technique and Pattern match technique. In one aspect, the DUT image may be verified by verifying the content and the location of the content upon referring to the DUT configuration file (514) storing the content along with their respective location in the zone. Upon verification, the system 102 may generate a report based on the verification of the content and the location of the content. In one aspect, the report indicates a test status of the test DUT image either as PASS or FAIL.

Figure 6:
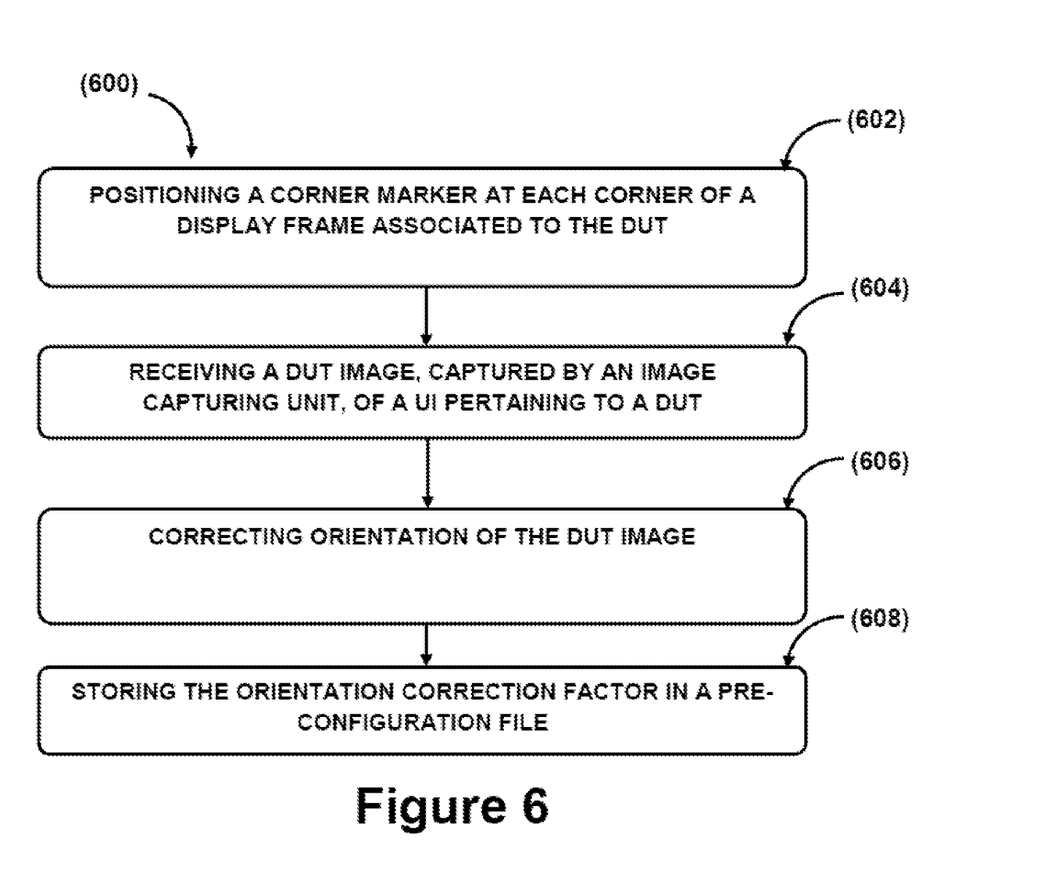
FIG. 6 illustrates a method for performing the UI verification of the DUT, in accordance with an embodiment of the present subject matter.

Referring now to FIG. 6, a method 600 for performing User Interface (UI) verification of a Device Under Test (DUT) is shown, in accordance with an embodiment of the present subject matter. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combination thereof. However, for ease of explanation, in the embodiments described below, the method 600 may be considered to be implemented as described in the system 102.

At block 602, a corner marker of a set of corner markers 302 may be positioned at each corner of a display frame of the DUT.

At block 604, a DUT image of a UI pertaining to the DUT may be received. In one aspect, the DUT image is received by an image capturing unit captured the DUT image. In one implementation, the DUT image may be received by the image receiving module 212.

At block 606, orientation of the DUT image may be corrected by determining an orientation correction factor. The orientation correction factor may be determined by verifying whether each corner marker, positioned at respective corners of the display frame, is present in the DUT image, zooming at least one of IN and OUT a focus of the image capturing unit in a manner such that each corner marker is present in the DUT image, aligning the DUT image based on the set of corner markers 302, verifying a content and a location of the content present in the DUT image upon referring to a DUT configuration file (514), and determining whether the DUT image is occupying content greater than a predefined threshold percentage of content present in the UI of the DUT. In one implementation, the orientation correction factor may be determined by the skew correction module 214.

At block 608, the orientation correction factor may be stored in a pre-configuration file (512) when the DUT image is occupying the content greater than the predefined threshold percentage. In one aspect, the orientation correction factor may be referred while testing a UI of the DUT. In one implementation, the orientation correction factor may be stored by the file configuration module 216.

Exemplary embodiments discussed above may provide certain advantages. Though not required to practice aspects of the disclosure, these advantages may include those provided by the following features.

Some embodiments enable a system and a method to obtain a better image which needs less post processing for User Interface (UI) verification.

Some embodiments enable a system and a method to improve the quality of the image of the UI pertaining to a Device Under test (DUT) as per the testing requirement.

Some embodiments enable a system and a method to verify and correct the display orientation of the DUT.

Although implementations for methods and systems for performing User Interface (UI) verification of a Device Under Test (DUT) have been described in language specific to structural features and/or methods, it is to be understood that the appended claims are not necessarily limited to the specific features or methods described. Rather, the specific features and methods are disclosed as examples of implementations for performing the UI verification of the DUT.

The invention claimed is:

1. A method of performing User interface (UI) verification of a Device Under Test (DUT) characterized by correcting orientation of a captured image associated to the UI, the method comprising:

positioning a corner marker, of a set of corner markers, at each corner of a display frame associated to the DUT;

receiving, by a processor, a DUT image of a UI pertaining to a DUT, wherein the DUT image is captured by an image capturing unit;

correcting, by the processor, orientation of the DUT image by determining an orientation correction factor, wherein the orientation correction factor is determined by,    verifying whether each corner marker, positioned at respective corners of the display frame, is present in the DUT image,    zooming at least one of IN and OUT a focus of the image capturing unit in a manner such that each corner marker is present in the DUT image, wherein the focus is zoomed when at least one corner marker, of the set of corner markers, is absent in the DUT image captured by the image capturing unit,    aligning the DUT image based on the set of corner markers,    verifying a content and a location of the content present in the DUT image upon referring to a DUT configuration file wherein the DUT configuration file comprises metadata associated to the content, and    determining whether the DUT image is occupying the content greater than a predefined threshold percentage of content present in the UI of the DUT; and storing, by the processor, the orientation correction factor in a pre-configuration file when the DUT image is occupying content greater than the predefined threshold percentage, wherein the orientation correction factor is to be referred while testing a UI of the DUT.

2. The method as claimed in claim 1, wherein the content comprises a textual content or a pictorial content, and wherein the location comprises X, Y coordinates of each pixel pertaining to the textual content and the pictorial content.

3. The method as claimed in claim 1, wherein the metadata comprises a textual content, a pictorial content, X, Y coordinates of each pixel pertaining to the textual content and the pictorial content present in the UI of the DUT, display resolution, Region of Interest (ROI), and expected text.

4. The method as claimed in claim 1, wherein the content is verified, upon applying an Optical Character Recognition (OCR) technique on the DUT image, by comparing the content with the metadata present in the DUT configuration file, and wherein the location of the content is verified upon comparing X, Y coordinates, of the content with X, Y coordinates, corresponding to the content, as stored in the DUT configuration file.

5. The method as claimed in claim 1, wherein the UI of the DUT is tested by, capturing, by the processor, a test DUT image, applying, by the processor, the orientation correction factor on the test DUT image upon referring to the pre-configuration file,    verifying, by the processor, the test DUT image by using at least one of a OCR technique and a Pattern matching technique,    verifying, by the processor, a content and a location of the content present in the test DUT image upon referring to the DUT configuration file; and    generating, by the processor, a report based on the verification of the content and the location of the content, wherein the report indicates a test status of the test DUT image either as PASS or FAIL.

6. The method as claimed in claim 1, wherein the display frame of the DUT is split into a plurality of zones ($Z_1$, $Z_2$, $Z_3$, $Z_4$), wherein each zone comprises the metadata including a subset of the content and the location of the subset of content, and wherein the metadata associated with each zone is stored in the DUT configuration file and wherein the metadata pertaining to a zone, of the plurality of zones ($Z_1$, $Z_2$, $Z_3$, $Z_4$), is focused by the image capturing unit based on a test case selected to test the UI of the DUT.

7. A system for performing User Interface (UI) verification of a Device Under Test (DUT) characterized by correcting orientation of a captured image associated to the UI, the system comprising:

a processor and a memory coupled to the processor wherein the processor is capable of executing a plurality of modules stored in the memory and wherein the plurality of modules comprising:

positioning a corner marker, of a set of corner markers, at each corner of a display frame associated to the DUT;

an image receiving module for receiving a DUT image of a UI pertaining to a DUT, wherein the DUT image is captured by an image capturing unit;

a skew correction module for correcting orientation of the DUT image by determining an orientation correction factor, wherein the orientation correction factor is determined by,        verifying whether each corner marker, positioned at respective corners of the display frame, is present in the DUT image,        zooming at least one of IN and OUT a focus of the image capturing unit in a manner such that each corner marker is present in the DUT image, wherein the focus is zoomed when at least one corner marker, of the set of corner markers, is absent in the DUT image captured by the image capturing unit,        aligning the DUT image based on the set of corner markers,        verifying a content and a location of the content present in the DUT image upon referring to a DUT configuration file wherein the DUT configuration file comprises metadata associated to the content, and        determining whether the DUT image is occupying content greater than a predefined threshold percentage of content present in the UI of the DUT; and      a file configuration module for storing the orientation correction factor in a pre-configuration file when the DUT image is occupying the content greater than the predefined threshold percentage, wherein the orientation correction factor is to be referred while testing a UI of the DUT.

8. The system as claimed in claim 7, wherein the content comprises a textual content or a pictorial content, and wherein the location comprises X, Y coordinates of each pixel pertaining to the textual content and the pictorial content.

9. The system as claimed in claim 7, wherein the metadata comprises a textual content, a pictorial content, X, Y coordinates of each pixel pertaining to the textual content and the pictorial content present in the UI of the DUT, display resolution, Region of Interest (ROI), and expected text.

10. The system as claimed in claim 7, wherein the content is verified, upon applying an Optical Character Recognition (OCR) technique on the DUT image, by comparing the content with the metadata present in the DUT configuration file, and wherein the location of the content is verified upon comparing X, Y coordinates, of the content with X, Y coordinates, corresponding to the content, as stored in the DUT configuration file.

11. The system as claimed in claim 7, wherein the UI of the DUT is tested by,
   capturing a test DUT image,
   applying the orientation correction factor on the test DUT image upon referring to the pre-configuration file,
   verifying the test DUT image by using at least one of a OCR technique and a Pattern matching technique,
   verifying a content and a location of the content present in the test DUT image upon referring to the DUT configuration file; and
   generating a report based on the verification of the content and the location of the content, wherein the report indicates a test status of the test DUT image either as PASS or FAIL.

12. The system as claimed in claim 7, wherein the display frame of the DUT is split into a plurality of zones ($Z_1$, $Z_2$, $Z_3$, $Z_4$), wherein each zone comprises the metadata including a subset of the content and the location of the subset of content, and wherein the metadata associated with each zone is stored in the DUT configuration file and wherein the metadata pertaining to a zone, of the plurality of zones ($Z_1$, $Z_2$, $Z_3$, $Z_4$), is focused by the image capturing unit based on a test case selected to test the UI of the DUT.

13. A non-transitory computer readable medium embodying a program executable in a computing device for performing User Interface (UI) verification of a Device Under Test (DUT) characterized by correcting orientation of a captured image associated to the UI, the program comprising:

a program code for positioning a corner marker, of a set of corner markers, at each corner of a display frame associated to the DUT;

a program code for receiving a DUT image of a UI pertaining to a DUT, wherein the DUT image is captured by an image capturing unit;

a program code for correcting orientation of the DUT image by determining an orientation correction factor, wherein the orientation correction factor is determined by,
   verifying whether each corner marker, positioned at respective corners of the display frame, is present in the DUT image,
   zooming at least one of IN and OUT a focus of the image capturing unit in a manner such that each corner marker is present in the DUT image, wherein the focus is zoomed when at least one corner marker, of the set of corner markers, is absent in the DUT image captured by the image capturing unit,
   aligning the DUT image based on the set of corner markers,
   verifying a content and a location of the content present in the DUT image upon referring to a DUT configuration file wherein the DUT configuration file comprises metadata associated to the content, and
   determining whether the DUT image is occupying the content greater than a predefined threshold percentage of content present in the UI of the DUT; and a program code for storing the orientation correction factor in a pre-configuration file when the DUT image is occupying content greater than the predefined threshold percentage, wherein the orientation correction factor is to be referred while testing a UI of the DUT.

* * * * *